United States Patent [19]

Blättermann

[11] 4,185,737

[45] Jan. 29, 1980

[54] CURVE CONVEYOR BELT AND METHOD AND APPARATUS FOR PRODUCING THE SAME

[76] Inventor: Karl-Günther Blättermann, Eichberg 24, 2000 Hamburg-Rahlstedt, Fed. Rep. of Germany

[21] Appl. No.: 836,793

[22] Filed: Sep. 26, 1977

Related U.S. Application Data

[63] Continuation of Ser. No. 668,683, Mar. 19, 1976, abandoned.

[30] Foreign Application Priority Data

Mar. 20, 1975 [DE] Fed. Rep. of Germany ....... 2512252

[51] Int. Cl.² ............................................ B65G 15/02
[52] U.S. Cl. ..................................... 198/831; 198/847
[58] Field of Search ............... 198/831, 844, 846, 847; 156/137, 264, 265, 583, 583.1; 152/301, 306, 308

[56] References Cited

U.S. PATENT DOCUMENTS

| | | | |
|---|---|---|---|
| 1,315,896 | 9/1919 | Wright | 156/264 |
| 1,504,596 | 8/1924 | Bastian | 156/264 |
| 2,391,731 | 12/1945 | Miller et al. | 156/137 |
| 3,100,565 | 8/1963 | Fry | 198/831 |
| 3,369,954 | 2/1968 | Fener | 156/583 |

*Primary Examiner*—Joseph E. Valenza
*Attorney, Agent, or Firm*—Milton M. Field

[57] ABSTRACT

An annular curve conveyor belt includes a plurality of sector-shaped pieces, the main direction of the inlay or inlays of which extends at right angles to a radial beam of the piece. In one embodiment, the pieces are arranged side by side in one layer with complementary zig-zag side edges in a bonded butt joint in the radial direction. In another embodiment, the pieces are arranged in two overlapping layers with the side edges of each piece extending obliquely to the radial direction. A method of producing the curve conveyor belt includes cutting the pieces from a conventional straight belt body at such an orientation that a radial beam of each piece extends at right angles to the main direction of tension and assembling and joining the pieces. Apparatus for performing this method is disclosed.

16 Claims, 4 Drawing Figures

CURVE CONVEYOR BELT AND METHOD AND APPARATUS FOR PRODUCING THE SAME

BACKGROUND OF THE INVENTION

This is a continuation of application Ser. No. 668,683 filed Mar. 19, 1976, now abandoned.

The invention relates to an annular curve conveyor belt of elastomeric material, including at least one fabric or plastic foil inlay which has its greatest tensile strength in a main direction of tension. The invention also relates to a method and an apparatus for producing such an annular curve conveyor belt.

As is well known, circular ring-shaped or annular curve conveyor belts serve as equipment in curve or corner conveying systems with which an endless closed portion of the curve conveyor belt traverses a curve at a certain radius between two conical return pulleys the axes of which are disposed at an angle corresponding to the curve length.

In the production of curve conveyor belts it was up to now started from especially wide straight belt bodies having the same structure as conventional straight conveyor belts. Upon vulcanization the curve conveyor belt is cut from such belt bodies at the desired length and if possible in a single piece which is then closed so as to provide an endless belt by one of the customary connecting methods. Of course, the belt body already must contain the inlay or inlays in the number and layer arrangement desired for the finished curve conveyor belt. Fabric and plastic foil inlays for conveyor belt production, however, normally have a main direction of tension, i.e. one specific direction in which their tensile strength is the greatest. With straight conveyor belts this is, of course, placed in the longitudinal direction of the conveyor belts. If an annular curve conveyor belt is cut from a belt body having at least one such inlay, the main direction of tension of the inlay or inlays of necessity coincides only once per 180° of arc length of the curve conveyor belt with the actual tangential main loading direction of the curve conveyor belt. At all other places there is an angular divergence between the main direction of tension and the main loading direction of up to 90°. In operation of the curve conveyor belt this leads to distortion of the inlay or inlays and thus of the entire curve conveyor belt which thus loses its exact circular ring shape which is required for precise traversing of curves without any disturbance. Besides, the loading capacity of the curve conveyor belt cannot be determined according to the greatest tensile strength of the inlay which is in the main direction of tension but instead must be dimensioned in accordance with the smallest tensile strength of the inlay which is in another direction.

SUMMARY OF THE INVENTION

It is an object of the invention to provide a curve conveyor belt which in operation will practically not show any distortion.

It is a further object of the invention to provide a method and an apparatus for producing a curve conveyor belt such as defined.

An annular curve conveyor belt of the type mentioned initially meeting these objects is characterized in accordance with the invention in that it is composed of a plurality of sector-shaped pieces having a maximum arc length of 45° and having the main direction of tension of the inlay or inlays in each piece extend at right angles to a radial beam of the piece.

Sector shaped pieces in the present context are portions of the curve conveyor belt of such shape that the individual pieces have their arcuate inner and outer edge in common with the curve conveyor belt and have two side edges adjoining the side edges of adjacent pieces, such side edges in the simplest case, yet not necessarily, extending in a radial direction. The term radial beam is to designate a straight line which passes in a radial direction with respect to the curve conveyor belt through the respective piece.

With the curve conveyor belt according to the invention the principle adopted so far of avoiding the subdivision of inlays to the greatest possible extent is disregarded on purpose. Instead the curve conveyor belt is composed of several pieces. These have the main direction of tension of their inlay or inlays differently oriented in each instance such that the main direction of tension coincides with the tangential main loading direction of the curve conveyor belt once per piece. The main directions of tension of successive pieces are thus angularly related as are the sides of a polygon extending about the center of curvature of the curve conveyor belt. As the maximum arc length of the pieces is 45°, there is much more frequent coincidence between the main direction of tension and the main loading direction and much less maximum angular divergence between the main direction of tension and the main loading direction with the curve conveyor belt according to the invention, based on the total arc length, than with known curve conveyor belts. The frequency of the coincidence is the greater and the maximum angular divergence the smaller, the smaller the arc length of the pieces is chosen. Thus at an arc length of the pieces of 45° at which the maximum value of the deviation in the most favorable case is no more than 22.5°, the curve conveyor belt according to the invention consequently suffers no distorsion worth mentioning and maintains its exact circular ring shape needed for smooth and perfect movement even over long operating times. The most favorable orientation of the main direction of tension for pieces having radial side edges is at right angles to a radial beam representing the angle bisector of the arc angle of the piece, because then the maximum angular divergence is the smallest. For pieces having differently directed side edges the most favorable orientation of the main direction of tension from the point of view of obtaining the smallest possible maximum angular divergence for the greatest possible area of the piece can be determined easily empirically. However, in any case the main direction of tension must extend at right angles with respect to any radial beam of the piece in order that the desired coincidence between main direction of tension of the inlay or inlays and tangential main loading direction is achieved once per piece.

Contrary to the impression which suggests itself at first glance the curve conveyor belt according to the invention, in spite of the cutting-up of the inlay or inlays, is not inferior but more likely superior in tensile strength to conventional curve conveyor belts having the same inlays. On the one hand this is due to the fact that the interconnection of the pieces can be effected by the conventional connecting methods to render conveyor belts endless, by means of which methods strength values are obtained for the connections which are equivalent to those of the conveyor belt proper. Another reason is the fact that the greatest tensile strength of the inlay or inlays with the curve conveyor belt according to the invention is utilized much better than with known curve conveyor belts because of the very small angular divergence between the main direction of tension and the main loading direction. Of course, among others for reasons of manufacture, one cannot go to extremes with cutting-up the inlay or inlays, in other words diminishing the arc length of the pieces to any minute degree. The most favorable compromise between this criterion and the greater approach between main direction of tension and main loading direction at decreasing arc length in practice proved to be an arc length of the pieces from 20° to 30°. Based on the number and strength of its inlay the curve conveyor belt then has optimum tensile strength and practically complete freedom from distortion at the same time. For the same reason and in the interest of uniform structure of the belt the arc length conveniently is chosen to be the same with all pieces of a curve conveyor belt.

In a preferred embodiment of the novel curve conveyor belt all pieces are arranged side by side in one layer and thus interconnected only along their adjoining side edges. Each piece contains the inlay or inlays in a number and layer arrangement corresponding to that of the finished curve conveyor belt. Although any kind of connection is possible for interconnecting the pieces as long as it provides a sufficiently firm and flexible connection, it is particularly convenient with this embodiment for the pieces to have zig-zag side edges with respect to the radial direction. These side edges are complementary at adjacent pieces, and adjacent pieces may be united along the same in butt joint by cold or hot bonding. The zig-zag course of the side edges provides a connection of pieces without any disturbing transition. Moreover, an indirect inclined cut of the joint is obtained by means of which in well known manner movement about the return pulleys is facilitated and peeling or any other disintegration of the joint at the return pulleys is prevented. The embodiment described is preferably destined for curve conveyor belts of light to medium work load having as a rule only one inlay, the arc length of the pieces at best being 20°. The butt joint along the zig-zag side edges is produced especially easily with curve conveyor belts made from polyvinylchloride, at the same time providing maximum strength.

In another preferred embodiment of the novel curve conveyor belt the pieces are arranged in two layers overlapping each other as in brickwork. In this case the interconnection of the pieces is established not only along the side edges but predominantly along the overlapping partial surfaces of the pieces in mutual contact. This provides a particularly firm and sturdy composite structure of the pieces. This embodiment is particularly intended for heavier curve conveyor belts especially those made from rubber having more than one inlay, as a rule two inlays. In this case the individual pieces comprise part of the inlays of the finished curve conveyor belts, for instance one inlay and one cover layer resulting in the desired cross sectional structure of the curve conveyor belt because of the double-layer composite structure of the pieces in brickwork fashion. If the curve conveyor belt in this case is symmetrical with respect to its central plane in cross section, all the pieces may be of the same structure, a favorable factor as regards their manufacture.

The brickwork combination of the pieces has another advantage in that good approach between the main direction of tension and the main loading direction based on a certain arc length of the pieces is obtained because each piece is covered by two other pieces which, as compared to the piece under consideration, are offset by half the arc angle of the piece in their position in the curve conveyor belt and thus also with respect to the main direction of tension of their inlay or inlays.

Theoretically the principle of the brickwork-fashion overlapping may also be applied with an arrangement of the pieces in more than two layers. However, this will result in curve conveyor belts of a thickness for which there is no demand, at least not at the present time.

In connection with this last embodiment of the novel curve conveyor belt pieces are preferred of a shape with straight side edges extending obliquely to the radial direction at an acute angle. The straight course of the side edges is sufficient because by virtue of the overlapping of the pieces the strength of the connection along the butt joint of the side edges is of minor importance for the tensile strength of the curve conveyor belt. The inclined direction of the side edges as compared to the radial direction is chosen in analogy to the customary connection of straight conveyor belts for obtaining an obliquely cut joint. This affords the known advantages which have been briefly mentioned above in connection with the zig-zag side edges. Of course, also in connection with the overlapping in brickwork fashion pieces of different shape may be selected, in particular pieces with zig-zag side edges.

The invention also relates to a method of producing the novel annular curve conveyor belt by cutting it from a conventional straight belt body, with which the main direction of tension of the inlay or inlays coincides with the longitudinal direction of the belt body. This method is characterized in that individual sector-shaped pieces are cut from the belt body at such an orientation that a radial beam each of the piece extends at right angles to the main direction of tension and that the pieces are assembled and mutually connected to form the curve conveyor belt.

The advantage of this method resides in the fact that a curve conveyor belt without distortion is cut from a belt body which is not characterized by any peculiarities as compared to a belt body for the normal straight conveyor belts, and therefore may be produced in the conventional manner in any production plant for straight conveyor belts. This provides a considerable gain in the rationalization of production and affords excellent quality of the novel curve conveyor belt. In addition, the belt body to be used as starting material may be utilized very efficiently, in other words leaving little residue since the individual pieces can be cut closely nested from the belt body.

Manufacture of the curve conveyor belt according to the invention may start from a finished vulcanized belt body from which the pieces are cut and united by cold or hot bonding to form the curve conveyor belt. This production method is especially convenient for curve conveyor belts with which the individual pieces are arranged side by side in one layer and have zig-zag side edges. With this method it is best to punch the individual pieces with their zig-zag side edges from the belt body in a single operation.

As an alternative the pieces may be cut from a raw unvulcanized belt body, then assembled to form the curve conveyor belt and joined by vulcanization or curing. This method of production is especially suitable for curve conveyor belts in which the pieces overlap each other in brickwork fashion. It combines the operation of vulcanization and interconnection of the pieces and moreover results in a particularly intimate composite structure of the pieces.

The last method is best carried out by an apparatus according to the invention, with which an assembly form for continuously joining the cut-out, sector-shaped pieces and downstream thereof a vulcanizer heating press operating in cycles are provided. Contrary to the production of known curve conveyer belts as explained initially this apparatus is suitable for the continuous production of curve conveyor belts at great length to be kept in stock and from which any desired partial length may be cut and closed to become endless to serve as equipment for a specific curve conveyor belt system. For optimum utilization of the press room and of the heat the vulcanizer heating press preferably comprises press plates of circular ring shape corresponding to the greatest width of curve conveyor belts to be produced.

BRIEF DESCRIPTION OF DRAWINGS

The invention will be described further, by way of example, with reference to the accompanying drawings of two preferred embodiments of a curve conveyor belt:

FIG. 2b is a lateral view of the inner edge of the curve conveyor belt shown in FIG. 2a.

DESCRIPTION OF PREFERRED EMBODIMENTS

Figure 1:
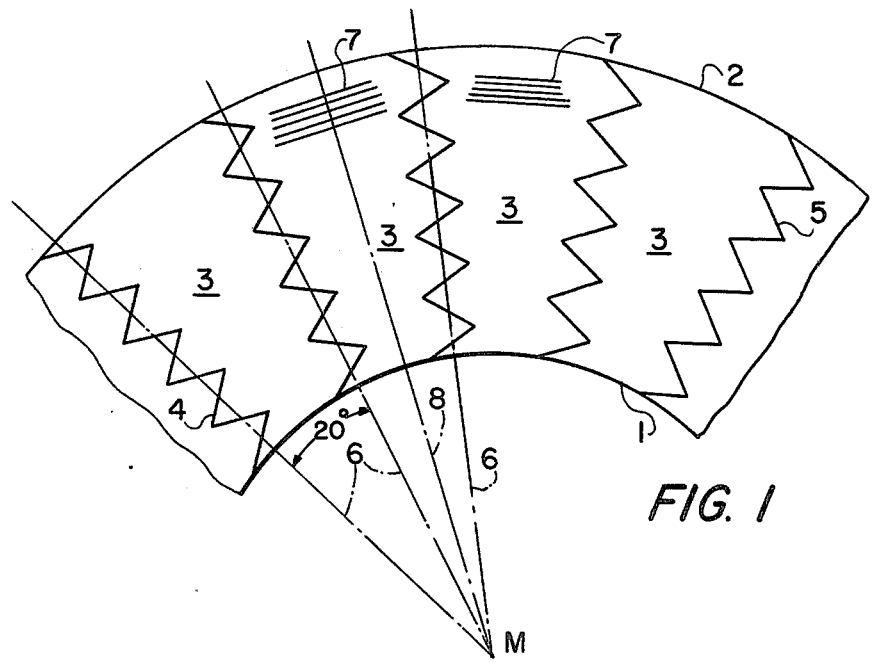
FIG. 1 is a plan view of a portion of a curve conveyor belt according to the invention.

The curve conveyor belt shown in FIG. 1 has an arcuate inner edge 1 and a concentric outer edge 2 curved in the form of the arc of a circle about an assumed center M. The curve conveyor belt is composed of a plurality of sector-shaped identical pieces 3. Each piece has the inner edge 1 and the outer edge 2 of the curve conveyor belt and two complementary side edges 4 and 5 which extend in zig-zag manner with reference to the radial direction passing through center M. Each piece has an arc length of 20° measured as an angle between two radial beams 6 passing in the middle between the zig-zag side edges 4 and 5. The individual pieces 3 are disposed side by side in one layer and are bonded to each other in a butt joint along their complementary zig-zag side edges 4 and 5. Consequently eighteen pieces are needed to complete a full circle of the curve conveyor belt.

In a manner not specifically shown, the cross section of each piece corresponds to the structure of a conventional conveyor belt made from polyvinylchloride with a fabric inlay. The fabric of the inlay has a main direction of tension in which it has its maximum tensile strength. The individual pieces are aligned such that the main direction of tension of the inlay indicated by lines 7 in FIG. 1 in each piece extends at right angles to an assumed radial beam 8 of the piece, representing the angle bisector of the arc angle included between the lateral radial beams 6 of the piece. The main directions of tension of successive pieces, as indicated by lines 7, are thus angularly related as are the sides of a polygon extending about the center M of curvature of the curve conveyor belt.

Figure 2A:
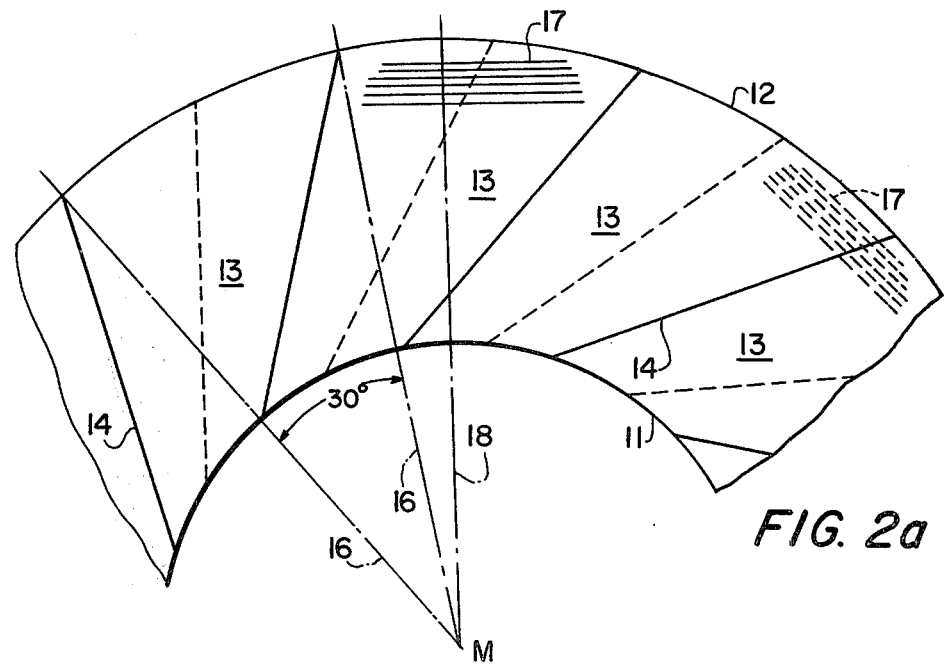
FIG. 2a is a plan view of a portion of another curve conveyor belt according to the invention.

The circular ring-shaped curve conveyor belt according to FIG. 2a is composed of a plurality of sector shaped identical pieces 13, as is the case with FIG. 1. The inner and outer edges of the pieces coincide with the arcuate inner edge 11 curved in the manner of the arc of a circle about an assumed center M and the concentric outer edge 12, respectively, of the curve conveyor belt. Each piece 13 has an arc length of 30° illustrated in FIG. 2a for one piece as the angle between two radial beams 16 extending through the two corners of the respective piece which are located on the inner edge 11. All pieces have two straight side edges 14 all inclined at the same acute angle, obliquely to the radial direction in the zone of the respective side edge, for instance, obliquely relative to the radial beam 16 which intersects the side edge on inner edge 11. In this embodiment the acute angle is chosen such that one of the two radial beams 16 associated with an inner corner of the piece forms a diagonal of the piece.

Figure 2B:
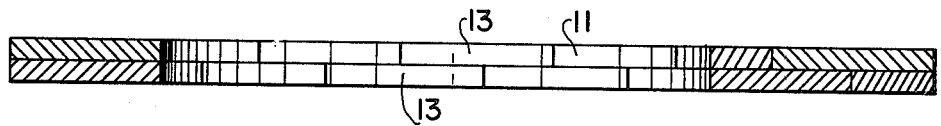

As may be seen in particular from FIG. 2b, the pieces 13 are arranged in two layers one above the other in mutual overlapping brickwork fashion, the pieces of one layer being offset by half an arc length of the pieces, i.e. by 15° with respect to the pieces of the other layers in the circumferential direction of the curve conveyor belt. In the manner known from conventional straight conveyor belts all pieces consist of a fabric inlay and a rubber cover layer and are arranged in the manner defined such that the composite curve conveyor belt has two interior inlays between two exterior cover layers. The fabric of the inlays has a main direction of tension which, as indicated by lines 17 in FIG. 2a, is directed such, with each individual piece 13, that it extends at right angles relative to a radial beam 18 which includes an angle of approximately 10° with radial beam 16 representing the diagonal of the piece and which intersects the outer edge 12 of the piece. The pieces 13 are joined by vulcanization after having been cut from a belt body blank and composed in the arrangement shown. As will be apparent from FIG. 2a, the main directions of tension, as indicated by lines 17, are angularly related as are the sides of a polygon extending about the center M of curvature of the surve conveyor belt.

Figure 3:
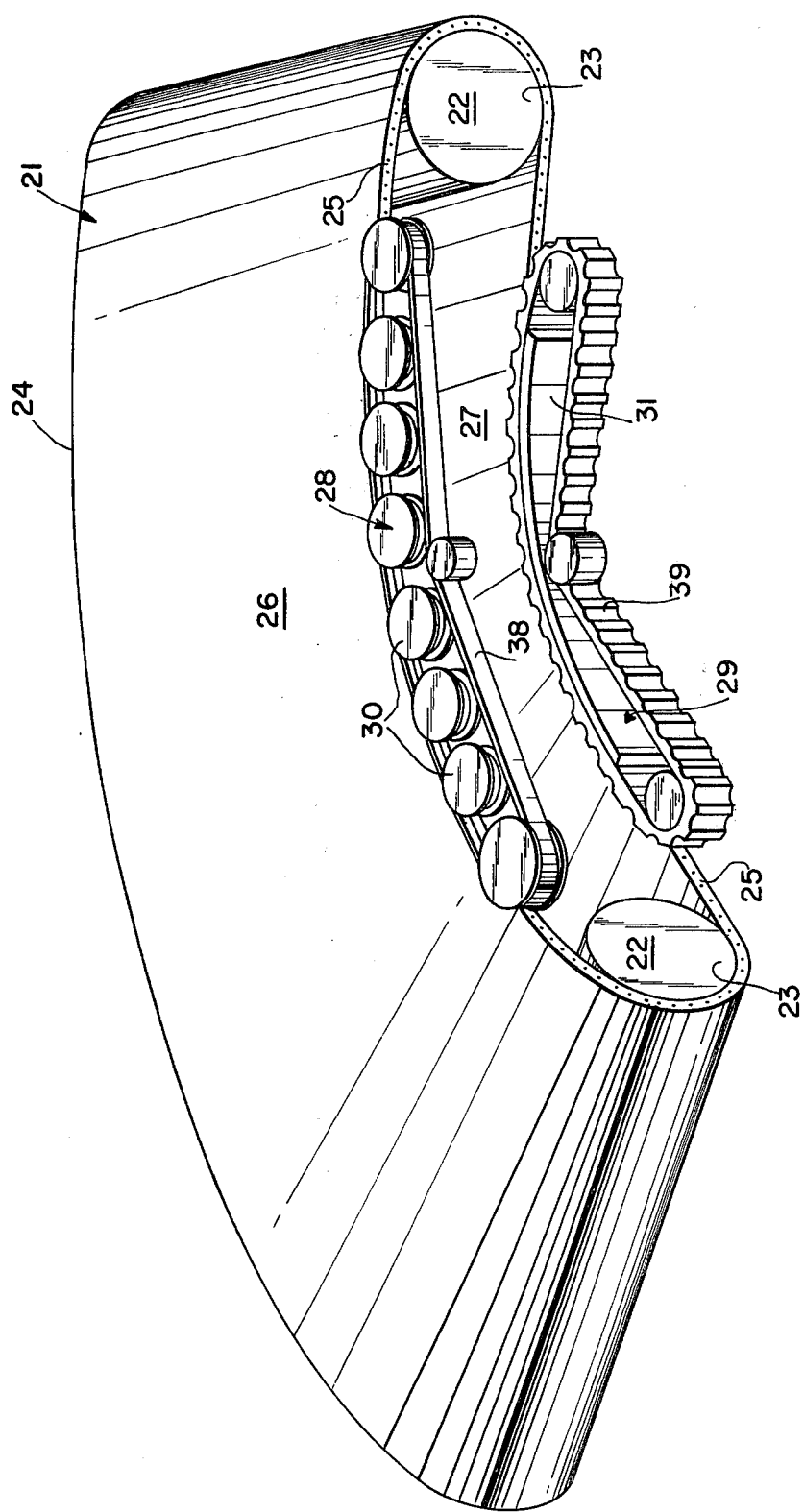
FIG. 3 is a diagrammatic elevational view of a curve conveyor belt system employing a conveyor belt according to the invention.

FIG. 3 shows a curve conveyor belt system including a curve conveyor belt 21 which may be designed as shown in FIG. 1 or 2a. All structural details are left out in this figure. Curve conveyor belt 21, cut at suitable length from belt material in stock and then closed to form an endless belt in any conventional manner, moves over two return pulleys 22, one of which is driven. The axes of rotation of the two return pulleys 22 lying in the same plane and extend at an angle relative to each other which corresponds to the curve to be traversed by the curve conveyor belt 21. Both return pulleys 22 are conical, the end face 23 shown in FIG. 3 being directed with its smaller radius inwardly, i.e. toward the assumed center of curvature. The upper run of curve conveyor belt 21, destined for conveyance of material, is designated by reference 26, while the returning lower run is marked 27. Two side guide means 28 and 29 each cooperating with the inner edge 25 are associated with the upper run 26 and the lower run 27, respectively, of the curve conveyor belt in order to prevent the belt from moving inwardly, i.e. in the direction from its outer edge 24 toward its inner edge 25 by virtue of transverse forces acting in the belt in curve conveyor belt systems. For purposes of illustration of various possible embodiments the figure shows two different side guide means, although in practice they will be of the same design for both runs. Both side guide means extend practically over the entire distance between the two return pulleys 22, and each comprises a plurality of rollers 30 or a slideway 31 along which the inner edge 25 of curve conveyor belt 21 is supported by way of an endless band 38 or 39, respectively, which may revolve freely and is taken along by the curve conveyor belt.

It will be understood that while the invention has been shown and described in the preferred form, changes may be made without departing from the scope of the invention as defined in the following claims.

What is claimed is:

1. An annular curve conveyor belt of elastomeric material having a center of curvature, said belt including at least one fabric or plastic foil inlay which has its greatest tensile strength in a main direction of tension, the curve conveyor belt being composed of a plurality of sector-shaped pieces with abutting side edges, each having a maximum arc length of 45°, and having the main direction of tension of the inlay or inlays in each piece extending at right angles to a radial beam of the piece, the main direction of tension of each piece being inclined with respect to the main direction of tension of the abutting pieces, the main directions of tension of successive pieces being angularly related as are the sides of a polygon extending about said center of curvature of the curve conveyor belt.

2. A curve conveyor belt according to claim 1, wherein the arc length is between 20° and 30°.

3. A curve conveyor belt according to claim 1, wherein all pieces have the same arc length.

4. A curve conveyor belt according to claim 1, wherein all pieces are arranged in one layer side by side.

5. A curve conveyor belt according to claim 4, wherein the pieces have side edges which are zig-zag shaped with respect to the radial direction and complementary to each other at adjacent pieces.

6. A curve conveyor belt according to claim 1, wherein the pieces are arranged in two layers mutually overlapping in brickwork fashion.

7. A curve conveyor belt according to claim 6, wherein the pieces have side edges which are zig-zag shaped with respect to the radial direction and complementary to each other at adjacent pieces.

8. A curve conveyor belt according to claim 6, wherein the pieces have straight side edges extending at an acute angle obliquely to the radial direction.

9. A curve conveyor belt according to claim 1, wherein said side edges of said sector-shaped pieces extend radially and wherein said radial beam of each piece bisects the arc angle of said piece.

10. A curve conveyor belt according to claim 1, wherein said radial beam is positioned to minimize the angular divergence within the piece from the radial beam.

11. A method of producing an annular curve conveyor belt having a center of curvature, wherein several individual sector-shaped pieces, each having a maximum arc of 45° between side edges, are cut from a conventional straight belt body in which the main direction of tension of the inlay or inlays coincides with the longitudinal direction of the belt body, said pieces being cut at an orientation at which a radial beam of each of the pieces extends at right angles to the main direction of tension, and wherein said pieces are joined in mutual connection with abutting side edges to form the curve conveyor belt, the main direction of tension of each piece being inclined with respect to the main direction of tension of the abutting pieces, the main directions of tension of successive pieces being angularly related as are the sides of a polygon extending about said center of curvature of the curve conveyor belt.

12. A method according to claim 11, wherein the pieces are cut from a finished vulcanized belt body and are joined by cold or hot bonding to form the curve conveyor belt.

13. A method according to claim 12, wherein pieces with zig-zag side edges are punched out of the belt body.

14. A method according to claim 11, wherein the pieces are cut from a raw, unvulcanized belt body, are assembled to form the curve conveyor belt, and are joined with one another by vulcanization.

15. A method according to claim 11, wherein each sector-shaped piece has an arc length in the range between 20° and 30°.

16. A method according to claim 11, wherein said radial beam is positioned to minimize the angular divergence within the piece from the radial beam.

* * * * *